US012640990B2

(12) United States Patent

Pichardo et al.

(10) Patent No.: US 12,640,990 B2
(45) Date of Patent: *May 26, 2026

(54) AUTOMATED SELF SERVICE ON A MULTI-CLOUD NETWORK PLATFORM

(71) Applicant: Elevance Health, Inc., Indianapolis, IN (US)

(72) Inventors: Jason Pichardo, Stafford, VA (US); Eric Kantner, Powhatan, VA (US); Vinay Kumar Soni, Bengaluru (IN); Aravind Krishnan, Haggardstown (IR); Akhil Lenka, Bobbili (IN); Clifford Libron, Henrico, VA (US); Ernest Ogbuanya, Woodbridge, VA (US); Nitin Phondekar, Pune (IN)

(73) Assignee: Elevance Health, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/003,390

(22) Filed: Dec. 27, 2024

(65) Prior Publication Data

US 2025/0373501 A1 Dec. 4, 2025

Related U.S. Application Data

(63) Continuation of application No. 18/676,274, filed on May 28, 2024, now Pat. No. 12,184,503.

(51) Int. Cl.
*H04L 41/14* (2022.01)
*H04L 41/22* (2022.01)
(Continued)

(52) U.S. Cl.
CPC ............ *H04L 41/145* (2013.01); *H04L 41/14* (2013.01); *H04L 41/22* (2013.01); (Continued)

(58) Field of Classification Search
CPC .............. H04L 41/22; H04L 43/06–20; H04L 41/14–149; H04L 43/04–045; H04L 43/0852–087
See application file for complete search history.

(56) References Cited

U.S. PATENT DOCUMENTS 7,987,262 B2 7/2011 Tung
9,935,825 B2 4/2018 Aswathanarayana
(Continued)

OTHER PUBLICATIONS

International Search Report and Written Opinion for related International Application No. PCT/US2025/030766, 11 pages, mailed Aug. 12, 2025.

*Primary Examiner* — Brendan Y Higa
(74) *Attorney, Agent, or Firm* — Morgan, Lewis & Bockius LLP

(57) ABSTRACT

A method is disclosed for evaluating network resources on a multi-cloud network platform. A network resource load balancer executes a network resource evaluation application on a server for automatic evaluation of implementing a user application via a first cloud based platform and a second cloud based platform. In response to an evaluation request, automatically and without user intervention, the server identifies a first server located in a first location on the first cloud based platform based on a source identifier; identifies a second server located in a second location on the second cloud based platform based on a target identifier; evaluates performance of the user application on the first server and the second server; in real time, determines performance data including a function latency for implementing the user application; and generates instructions to display the performance data according to a predefined format.

20 Claims, 11 Drawing Sheets

(51) Int. Cl.

| *H04L 41/5009* | (2022.01) |
|---|---|
| *H04L 43/08* | (2022.01) |
| *H04L 67/10* | (2022.01) |

(52) U.S. Cl.

CPC .......... *H04L 41/5009* (2013.01); *H04L 43/08* (2013.01); *H04L 67/10* (2013.01)

(56) References Cited

U.S. PATENT DOCUMENTS

| 10,708,152 | B2 | | 7/2020 | Kulshreshtha | |
|---|---|---|---|---|---|
| 11,212,238 | B2 | * | 12/2021 | Cidon | H04L 43/06 |
| 11,563,628 | B1 | * | 1/2023 | Hassan | H04L 41/0686 |
| 11,677,621 | B2 | | 6/2023 | NagarajeGowda | |
| 2014/0282536 | A1 | * | 9/2014 | Dave | G06Q 30/0631 |
| | | | | | 718/1 |
| 2019/0104111 | A1 | * | 4/2019 | Cidon | H04L 12/14 |
| 2019/0129738 | A1 | | 5/2019 | Ekbote | |
| 2019/0179725 | A1 | | 6/2019 | Mital | |
| 2020/0287806 | A1 | | 9/2020 | Kulshreshtha et al. | |
| 2020/0382610 | A1 | | 12/2020 | Chandrashekar | |
| 2021/0067373 | A1 | * | 3/2021 | Cidon | H04L 41/0806 |
| 2021/0289046 | A1 | * | 9/2021 | Sinha | H04L 67/63 |
| 2021/0409287 | A1 | | 12/2021 | Chunduru Venkata | |
| 2022/0278922 | A1 | * | 9/2022 | Kolar | H04L 43/0894 |

* cited by examiner

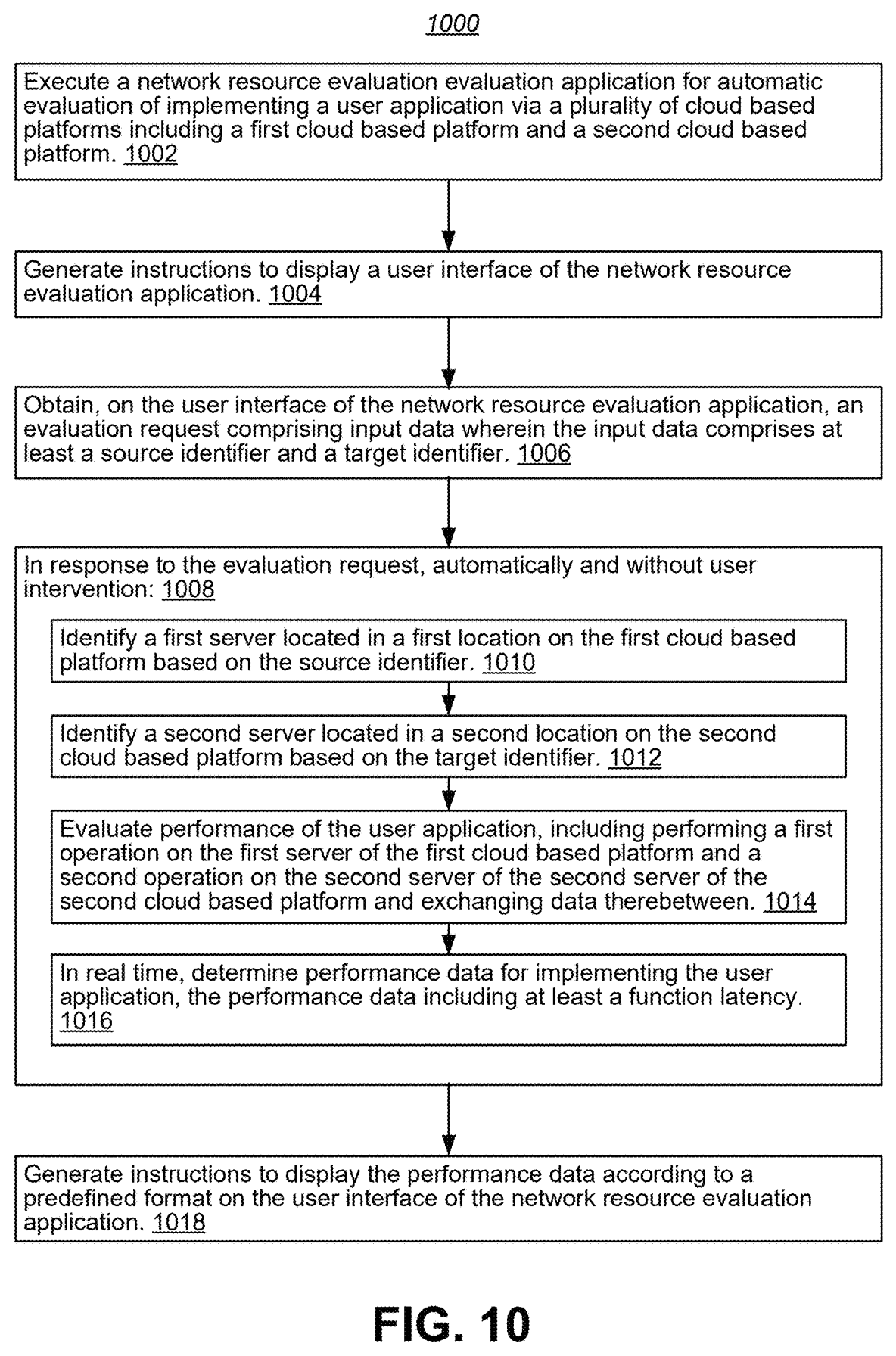

_1000_

Execute a network resource evaluation evaluation application for automatic evaluation of implementing a user application via a plurality of cloud based platforms including a first cloud based platform and a second cloud based platform. 1002

Generate instructions to display a user interface of the network resource evaluation application. 1004

Obtain, on the user interface of the network resource evaluation application, an evaluation request comprising input data wherein the input data comprises at least a source identifier and a target identifier. 1006

In response to the evaluation request, automatically and without user intervention: 1008

Identify a first server located in a first location on the first cloud based platform based on the source identifier. 1010

Identify a second server located in a second location on the second cloud based platform based on the target identifier. 1012

Evaluate performance of the user application, including performing a first operation on the first server of the first cloud based platform and a second operation on the second server of the second server of the second cloud based platform and exchanging data therebetween. 1014

In real time, determine performance data for implementing the user application, the performance data including at least a function latency. 1016

Generate instructions to display the performance data according to a predefined format on the user interface of the network resource evaluation application. 1018

FIG. 10

AUTOMATED SELF SERVICE ON A MULTI-CLOUD NETWORK PLATFORM

CROSS-REFERENCE TO RELATED APPLICATIONS

This application claims priority to U.S. patent application Ser. No. 18/676,274 filed May 28, 2024, the entirety of which is incorporated herein by reference.

TECHNICAL FIELD

The disclosed implementations relate generally to account provisioning for digital access, more specifically to systems and methods for provisioning the use of hosting cloud services, including for software development.

BACKGROUND

Businesses often need to create and provide accounts to multiple cloud based platforms, to their employees and other workers, including commercial third party cloud based platforms in addition to any in-house platforms that may exist. For example, a business involved in developing software applications in a cloud environment require accounts to be provisioned for developers, so the development team can perform development activities and develop production applications. To provision such accounts is a manual, labor intensive process, with multiple actions that need to be performed, resulting in delay and re-work.

In accordance with processes known in the art, providing cloud account or workspace access may take as many as 6 weeks. An initial intake process may take 2 weeks, and account provisioning may take up to 4 weeks. The process lacks automation and is not streamlined. Accounts had to be provisioned manually, which results in mistakes and a lack of consistency. The current manual system restricts account or workspace scalability and involves lengthy manual provisioning. End user seeking accounts often have to raise multiple service requests involving hand-offs across multiple groups including cloud engagement, cloud operations, network infrastructure, network security, cloud security and enterprise encryption services, which also involved additional reviews with various manual steps. Manual intervention for account creation also results in project delays and repeated work. There are major dependencies on on-premise IT systems such as directory services that required manual provisioning that needed to be addressed as part of the overall automated cloud environment provisioning process. As such, there is a need for automated self-service capabilities for developers to provision cloud services.

SUMMARY

Accordingly, there is a need for an automated, integrated approach to provisioning and use of Cloud services that spans multiple Cloud Service Providers, to help teams, e.g. application development teams, adopt cloud for hosting their application. Particularly, in many situations, application developer need to evaluate performance of user applications that are launched on a cloud-based network platform for the purposes of improving utilization of network resources and enhancing operations of these user applications. This application provides an automatic self-servicing cloud evaluation solution allowing the application developers to collect performance data of the user applications executed on the cloud-based network platform automatically and without interacting with a network administrator. Such an automatic cloud evaluation solution may result in an improved experience for the application developers who used to wait for several hours or days to receive relevant performance data from the network administrator, thereby greatly expediting an application development, troubleshooting, or optimization process, which may in some embodiments be reduced from a few days to hours. This process may also reduce labor by the network administrator, allowing allocation of more resources of the administrator to improving network performance than to supporting application development. In some embodiments, an evaluation task is automated and completed in a few seconds or minutes with improved developer experience as well, and the application team may focus on innovation and delivery of functionality to customers.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for automatic evaluation of implementing a user application via a plurality of cloud based platforms.

The method includes at a network resource load balance on a server, executing the network resource evaluation application for automatic evaluation of implementing the user application via the plurality of cloud based platforms including a first cloud based platform and a second cloud based platform. The method further includes generating instructions to display a user interface of the network resource evaluation application on a client device and obtaining, via the user interface of the network resource evaluation application from the client device, an evaluation request comprising input data wherein the input data comprises at least a source identifier and a target identifier. The method further includes, in response to the evaluation request, automatically and without user intervention: identifying a first server located in a first location on the first cloud based platform based on the source identifier; identifying a second server located in a second location on the second cloud based platform based on the target identifier, evaluating performance of the user application. Evaluation of the user application further includes determining a first operation and a second operation associated with the user application, performing the first operation associated with the user application; at the second server of the second cloud based platform, performing the second operation associated with the user application; and exchanging data associated with execution of the user application between the first server and the second server. The method further includes in real time, determining performance data for implementing the user application, the performance data including at least a function latency, and generating instructions to display the performance data according to a predefined format on the user interface of the network resource evaluation application.

In some embodiments, the performance data further includes one or more of: source/destination mapping information, an available bandwidth, a jitter, a loss percentage, protocol information, receiver octets, and transmitter octets.

In some embodiments, the predefined format includes a map format, and in accordance with the map format, the performance data are displayed on a map. The map includes a plurality of marks indicating at least the first server located in the first location, the second server located in the second location, and one or more information hops.

In some embodiments, each of the first cloud based platform and the second cloud based platform includes a plurality of respective servers distributed at a plurality of physical locations.

In some embodiments, the first server of the first cloud based platform corresponds to one or more processors configured to perform the first operation on data associated with the user application, and the second server of the second cloud based platform corresponds to a data server configured to perform the second operation to extract or store the data associated with the user application.

In some embodiments, the first cloud platform is the second cloud platform, and the first location is distinct from the second location. The first server and the second server are distinct from each other and belong to the first cloud platform.

In some embodiments, the first cloud based platform is provided by a first third-party cloud provider. The second cloud based platform is provided by a second third-party cloud provider distinct from the first third-party cloud provider. Both the first third-party cloud provider and the second third-party cloud provider are distinct from a service provider of the network resource evaluation application or the user application.

In another aspect, a system includes one or more processors and memory having instructions stored thereon, which when executed by the one or more processors cause the processors to perform operations for performing any of the above methods.

In yet another aspect, a non-transitory computer-readable medium has instructions stored thereon, which when executed by one or more processors of a server system cause the processors to perform operations of any of the above methods.

BRIEF DESCRIPTION OF THE DRAWINGS

For a better understanding of the various described implementations, reference should be made to the Description of Implementations below, in conjunction with the following drawings in which like reference numerals refer to corresponding parts throughout the figures.

FIG. 10 is a flow diagram of a method for performing cloud evaluation on a multi-cloud network platform, in accordance with some embodiments.

DESCRIPTION OF IMPLEMENTATIONS

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

In some embodiments, the implements described herein include a Multi-Cloud Platform that provides an automated, integrated approach to allow an application developer to evaluate implementation of a user application on a multi-cloud network platform including a plurality of cloud-based platforms directly without waiting a network administrator to perform analysis and provide performance data. In some embodiments, implementations described herein help application teams to adopt cloud and optimize utilization of network resources for the user application in an efficient manner. In some embodiments, an evaluation task is automated and completed in a few seconds or minutes with improved developer experience, thereby allowing the application team to focus on innovation and delivery of functionality to customers.

Figure 1:
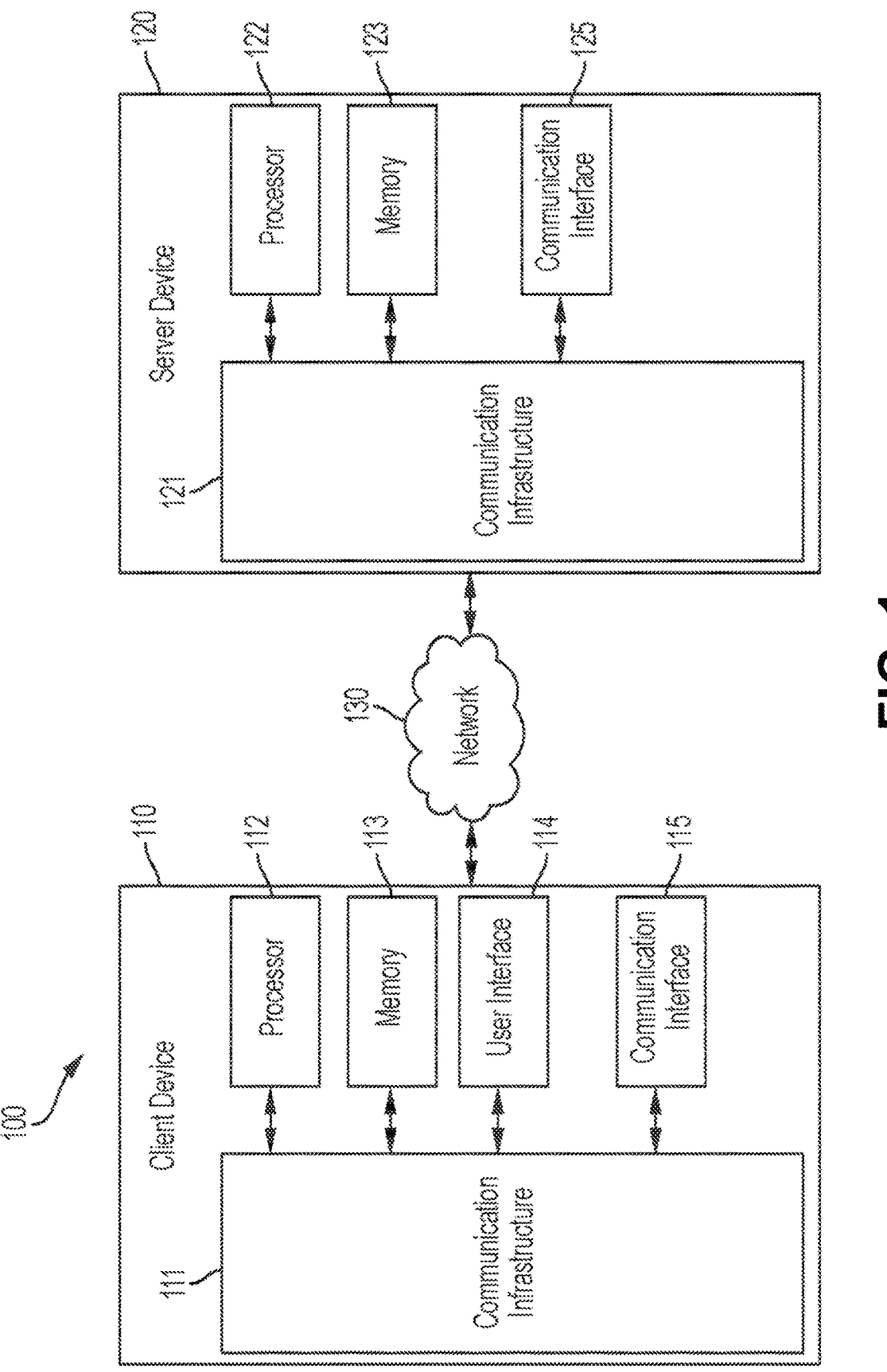
FIG. 1 is a block diagram of a system in accordance with an embodiment of the present disclosure.

FIG. 1 shows a block diagram that illustrates a system 100 for providing an automated, integrated approach to provisioning and use of cloud services that spans multiple cloud service providers. While some example features are illustrated, various other features have not been illustrated for the sake of brevity and so as not to obscure pertinent aspects of the example aspects disclosed herein. To that end, in at least one aspect, the system 100 may include one or more computers or servers, non-transitory memory operable to store one or more computer programs and one or more processors to implement the one or more computer programs. For example, the system 100, shown in FIG. 1, may include client device 110, server device 120 and network 130.

Client device 110 may be a computing device for receiving inputs from a user (e.g., a member), requesting data from server device 120 via network 130 and/or displaying data from server device 120 at the request of a user. Examples of a client device 110 may include a smart phone, tablet or a personal computer, among others.

Server device 120 may be any computing device, including one or more software modules (e.g., a scoring module) for receiving and/or responding to requests for data from client device 110. Examples of data may include web page data, hypertext markup language (HTML), text, video, audio as a free form speech describing symptoms and conditions, picture, software, executable, interpretable, byte-code, and binary files. In some aspects, the server device 120 may be a plurality of computing devices that process the request from the client device 110. The server device 120 may be configured to process requests from other computing devices in parallel with the request from the client device 110.

In one aspect, server device 120 is a web server that hosts a website. Client device 110 may be configured to request provider recommendations from server device 120 based on a hypertext transfer protocol (HTTP). Server device 120 may respond to a provider recommendation request by sending provider recommendation data (e.g., an ordered list of providers) to client device 110. In one aspect, provider recommendation data may include web page data included on an HTML web page. While the server device 120 may be configured for HTTP/HTML requests and responses, as described in the exemplary aspect above, the system 100 is not limited to the use of HTML or HTTP, and that aspects of the present invention can be used with any computer communication language or network protocol suitable for the purposes of the described communications between client device 110 and server device 120.

Client device 110 may include communication infrastructure 111, processor 112, memory 113, user interface 114 and communication interface 115. Server device 120 may include communication infrastructure 121, processor 122, memory 123 and communication interface 125.

Processor 112 or processor 122 may be any type of processor, including but not limited to a special purpose digital signal processor. Processor 112 is connected to a communication infrastructure 111 (for example, a bus or network). Processor 112 is connected to a communication infrastructure 121 (for example, a bus or network). Various software implementations are described in terms of this exemplary computer system.

Memory 113 or memory 123 may include one or more of: random access memory (RAM), a hard disk drive and a removable storage drive, such as a floppy disk drive, a magnetic tape drive, or an optical disk drive, etc. The removable storage drive may read from and/or writes to a removable storage unit. The removable storage unit can be a floppy disk, a magnetic tape, an optical disk, etc., which is read by and written to a removable storage drive. Memory 113 and/or memory 123 may include a computer usable storage medium having stored therein computer software programs and/or data to perform any of the computing functions of client device 110 and/or server 120. Computer software programs (also called computer control logic), when executed, enable client device 110 and/or server 120 to implement aspects of the present invention as discussed herein. Accordingly, such computer software programs represent controllers of client device 110 and/or server 120. Memory 123 may include one or more data stores that store data such as web page data, software files or any other types of data files. Server device 120 may retrieve the data from memory 123 before transmitting to client device 110 via network 130. Memory 123 may include member characteristics, provider characteristics, member-provider interaction characteristics, feature bias weightings, member/provider bias weightings, and learnt weightings, among other described herein.

User interface 114 may be produced by a program that controls a display (not shown) of client device 110. User interface 114 may include one or more peripheral user interface components, such as a keyboard or a mouse. The user may use the peripheral user interface components to interact with client device 110. User interface 114 may receive user inputs, such as mouse inputs or keyboard inputs from the mouse or keyboard user interface components. User interface 114 may display data, such as web pages, on the display of client device 110 using a web browser. While the user interface 114 may be configured for displaying data using a web browser, as described in the exemplary aspect above, user interface 114 is not limited to displaying data using a web browser, and that aspects of the present invention may contemplate using other display devices or software suitable for the purposes of the displaying the data.

Communication interface 115 and/or communication interface 125 allow data to be transferred between client device 110 and server device 120 via network 130. Examples of communication interface 115 or communication interface 125 may include a modem, a network interface (such as an Ethernet card), a communication port, a Personal Computer Memory Card International Association (PCM-CIA) slot and card, etc. Data transferred via communication interface 115 or communication interface 125 are in the form of signals, which may be electronic, electromagnetic, optical, or other signals capable of being transmitted or received by communication interface.

Network 130 connects client device 110 and server device 120 by carrying signals. Network 130 may be implemented using wire or cable, fiber optics, a phone line, a wireless link, a cellular phone link, a radio frequency link, or any other suitable communication channel. For instance, network 130 may be implemented using a combination of channels. Network 130 may be implemented as an intranet and/or an internet.

Figure 2:
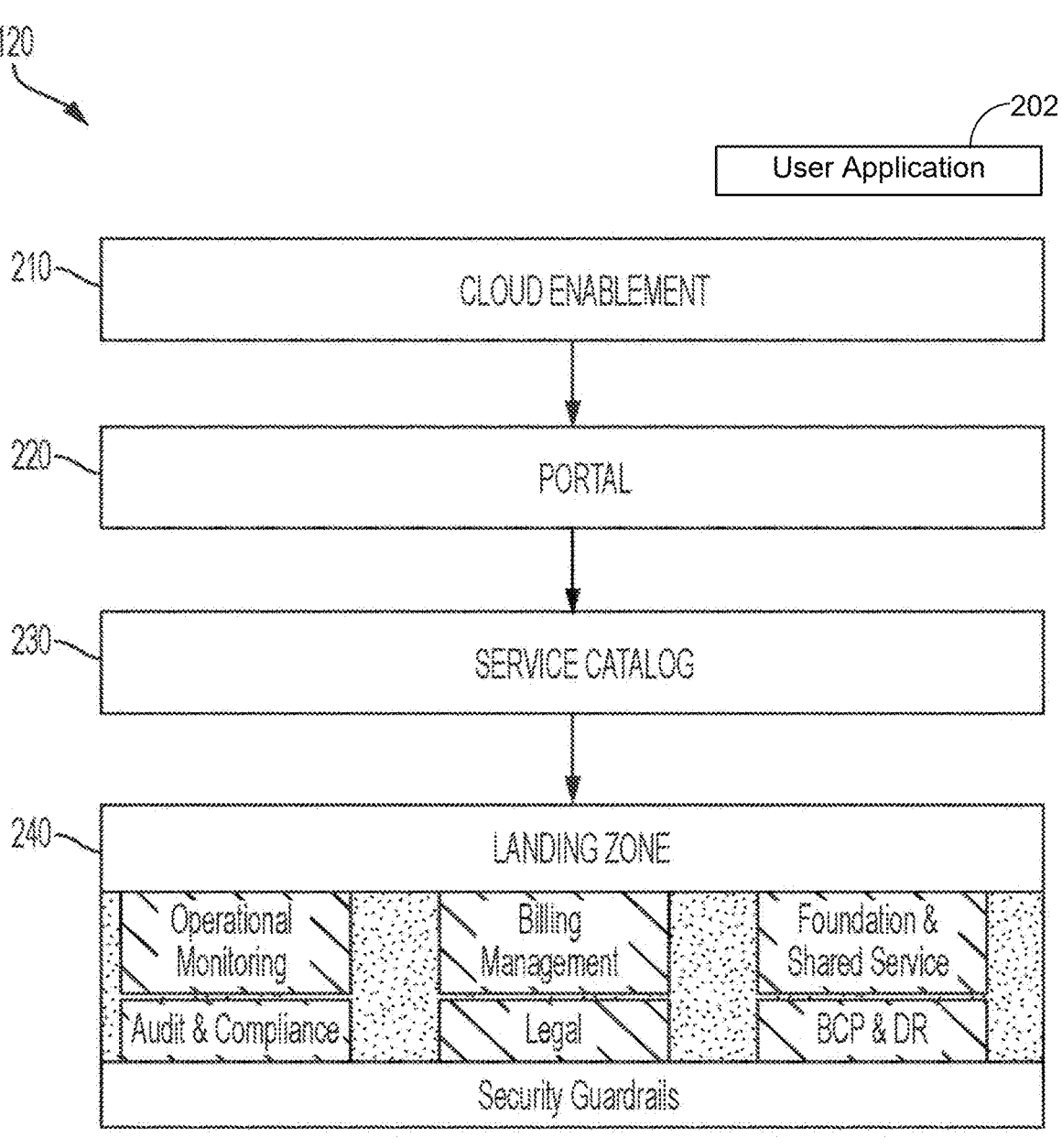
FIG. 2 is a conceptual block diagram of a server in accordance with an embodiment of the present disclosure.

FIG. 2 is a conceptual block diagram of the server device 120 of system 100 of FIG. 1, in accordance with one embodiment of the present disclosure. Cloud Enablement module 210 processes and provides a user application 202 (e.g., a dedicated application, a browser-based application) on boarding with Business unit or application owner. In some embodiments, the process may begin with a self-service portal module 220 that may provide account creation and automation capabilities to enhance development experience. Users and others may can request accounts and workspace via the portal. The portal may then make available a Service Catalog module 230, which may provide one or more sets of secured and predefined environments, which can in some embodiments be tiered, e.g. using Bronze, Silver, Gold and Platinum "Menu" service. These tiers may correspond to sandbox, development, SIT and Production environments. Service Catalog Module 230 may provide account and workspace creation capability. Landing zone module 240 may then provide a secure flexible multi-account structure-based cloud and may present account categories in accordance with organizational best practices. For example, core components may include Foundation & Shared Services, Billing Management, Legal, Operational Monitoring, Audit & Compliance, Business continuity planning & Disaster Recovery, and Security Guardrails.

Figure 3:
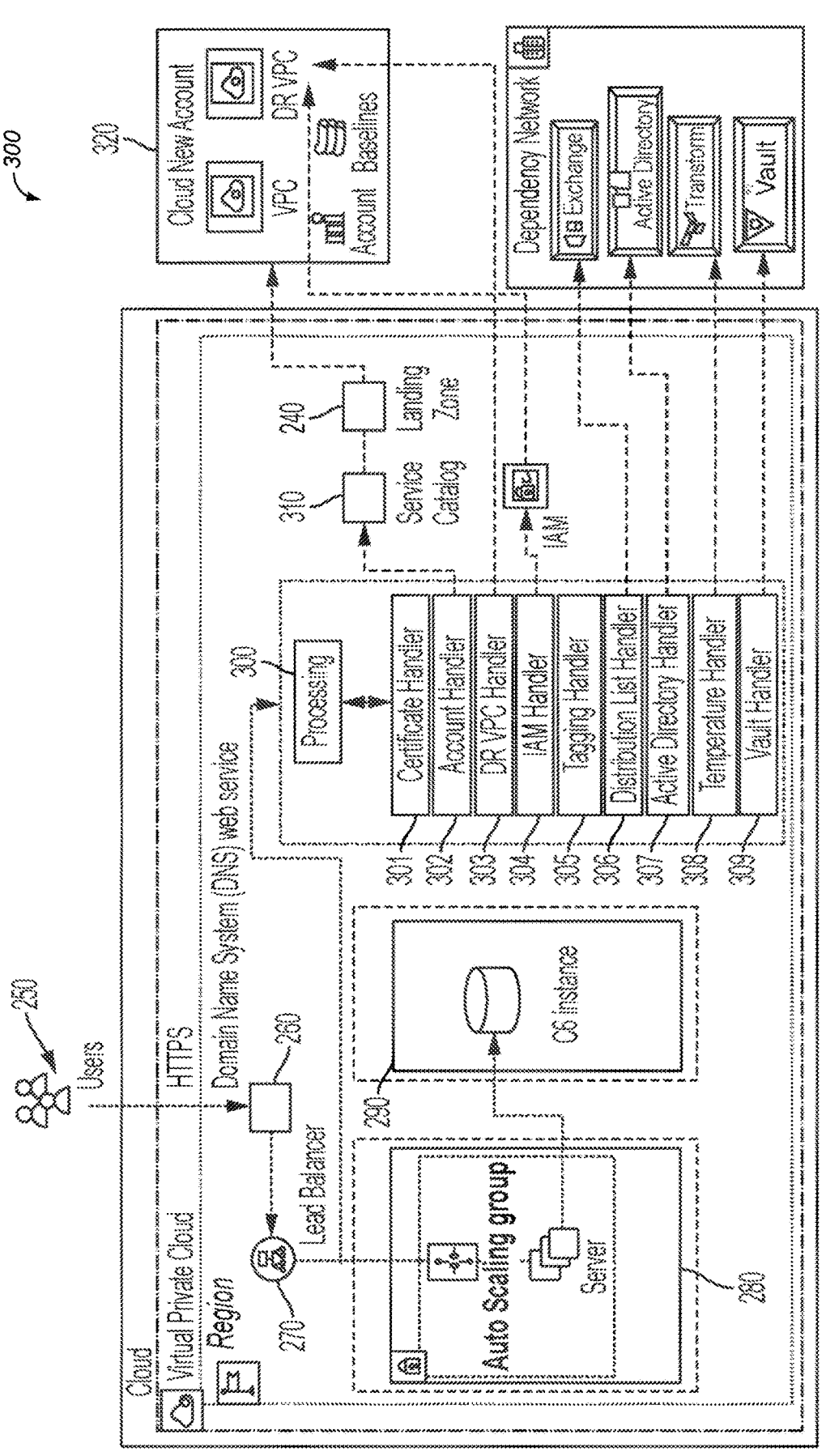
FIG. 3 is a conceptual representation of a system in in accordance with an embodiment of the present disclosure.

FIG. 3 shows an overview diagram of a system 380 in accordance with one embodiment the present disclosure. One or more users 250 (e.g., application developers 350 in FIG. 4) may request cloud account creation, e.g. of accounts in which application development, testing and production deployment activities can be performed. Domain Name System (DNS) web service 260 routes end users to Internet applications by translating names into the numeric IP addresses for servers. In some embodiments, traffic from DNS web service 260 may be passed to load balancer 270 which routes client requests across multiple servers 280 that are capable of fulfilling requests, to maximize speed and capacity utilization and avoid overworked servers that can negatively impact performance. If a server 280 goes down, load balancer 270 may redirect traffic to remaining online servers 280. When a new server 280 is added to the server group, load balancer 270 may automatically start to send requests to it.

Server 280 has a hosted web application interface for users to interact with. User interaction may include filling a form requesting provisioning of access and Cloud accounts. Database Instance 290 captures and maintains metadata and information from user interface that is running on server 280. Processing 300 involves multiple activities which may be required for or used in account and user access provisioning. Activities performed by processing 300 will be discussed in further detail below in reference to other figures. In certificate handler 301, one or more certificates required for access are generated. Certificate handler 301 provisions a way to generate one or more certificates. Account handler 302 creates Cloud accounts in accordance with organizational security and compliance requirements. DR VPC handler 303 creates Virtual private cloud for Disaster recovery needs. Disaster Recovery involves a set of policies, tools and procedures to enable the recovery or continuation of vital technology infrastructure and systems following a natural or human-induced disaster. Identity and Access Management (IAM) Handler 304 creates IAM roles on Cloud accounts to access cloud account and create infrastructure resources. Tagging Handler 305 tags infrastructure resources so they can be triaged and separated, e.g. based on which division or unit has requested access. Distribution List Handler 306 is used to Create, Read, Update, and Delete E-mail Distribution Lists internal to the organization, e.g. if new user accounts are added to or deleted from existing list. Active directory (AD) handler sub-component 307 creates AD groups, which may be used to grant developer's access to cloud accounts, which may include Amazon Web Services (AWS) accounts; workspaces, which may include Terraform workspaces; and secrets engine which may include a Vault secrets engine. Workspace handler 308 may be used for resource provisioning in cloud accounts. In workspace handler 308, workspaces are created which may be used by application teams for infrastructure deployments. Workspaces in some embodiments may be created using Terraform. Secrets Engine Handler 309 sets up and configures a secrets engine, both to store secrets and securely connect workspaces and cloud accounts. In some embodiments, the secrets engine may be implemented in Vault.

Service catalog 310 provides set of secured and predefined environments using a tier system such as Bronze/Silver/Gold and Platinum "Menu" service. These tiers may represent sandbox, development, SIT and Production environments. Service catalog 310 provides account and workspace creation capability. Service catalog 310 may have one or more scripts that create the cloud accounts and incorporate baseline security requirements in them. Landing zone 240 provides secure flexible multi-account structure-based cloud and best practices as described above. Finally, in the Cloud New account module 320, new accounts are provided to requesting users.

Figure 4:
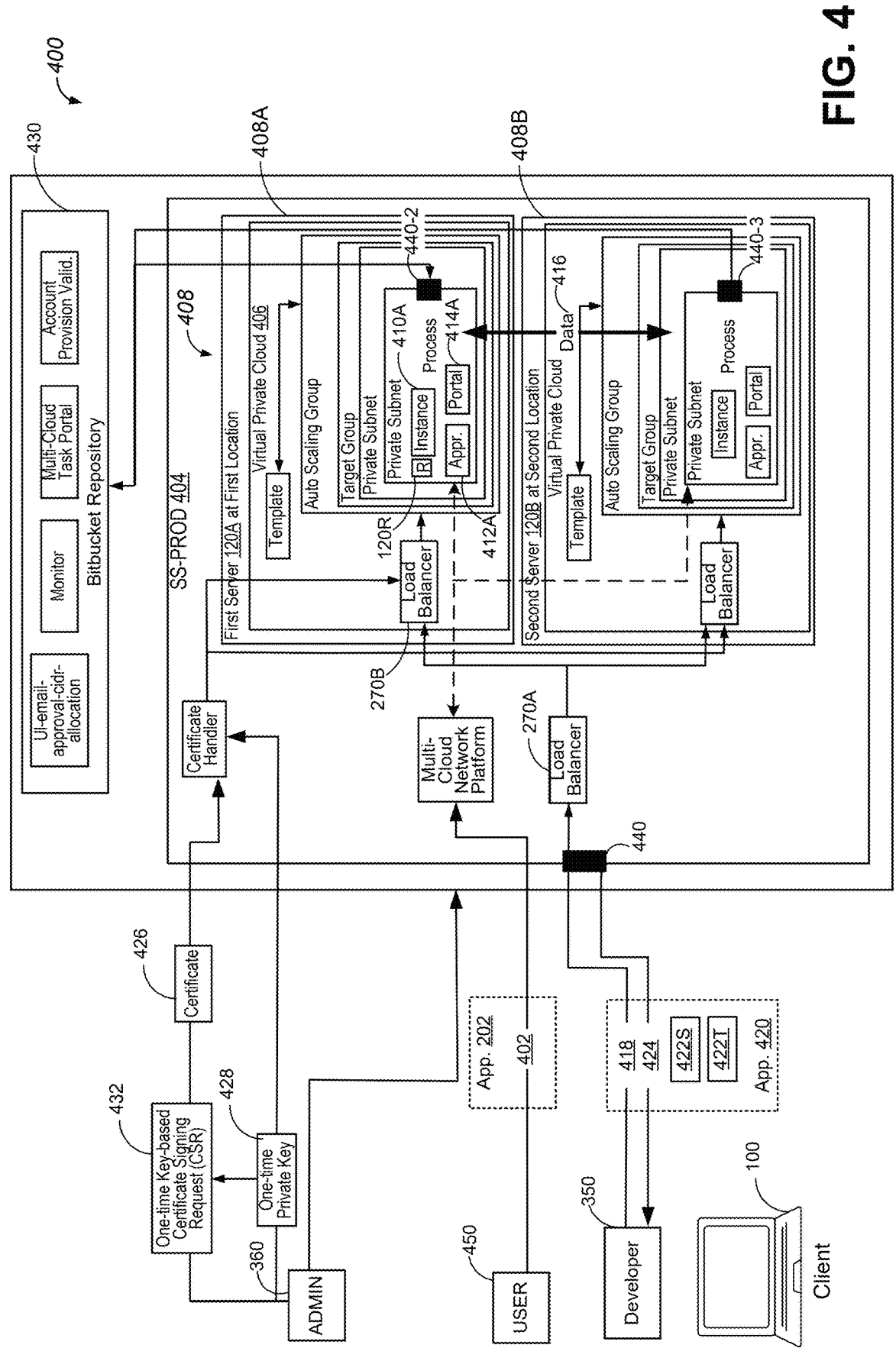
FIG. 4 is a flow diagram of a process of applying a network resource evaluation application to evaluate a user application on a multi-cloud network platform, in accordance with some embodiments.

FIG. 4 is a flow diagram of a process 400 of applying a network resource evaluation application 420 to evaluate a user application 202 on a multi-cloud network platform, in accordance with some embodiments. A hosted landing zone 240 and associated records are created for a cloud account 320 and are shared with a plurality of cloud accounts 320 through a resolver. Each of the user application 202 and the network resource evaluation application 420 may be accessed through a respective Uniform Resource Locator (URL). When a user 450 tries to access a URL of the user application 202, a request 402 is issued to execute the user application 202. An example domain name associated with the network resource evaluation application 420 is "multi-cloudnetworkservices.awsdns.internal.das." In some embodiments, when a user 450 tries to access a URL directed to the domain name, an evaluation request 418 for evaluating the user application 202 is received by a load balancer 270A which is listening on a first portal 440-1 in a secure socket production (SS PROD) environment 404. The load balancer 270A collaborates with load balancers 270B of virtual private cloud (VPC) environments 406 created on a plurality of cloud based platforms 408. The plurality of cloud based platforms 408 includes at least a first cloud based platform 408A and a second cloud based platform 408B. In some embodiments, each of the first cloud based platform 408A and the second cloud based platform 408B includes a plurality of respective servers 120 distributed at a plurality of physical locations.

In some embodiments, in a private subnet of the first cloud based platform 408A, a reverse proxy server 120R executes an instance 410A to check whether the evaluation request 418 is for an approval 412A or a portal access 414A and redirect the evaluation request 418 associated with the user application 202 to the network resource evaluation application 420 running on a second portal 440-2 for approval 412A and a third portal 440-3 for the portal access 414A. In an example, the evaluation request 418 is for a Classless Inter-Domain Routing (CIDR) approval associated with the first cloud based platform 408A. The load balancer 270B receives the response from the evaluation application 420 and sends the response back to the user 450 via the load balancer 270A. This load balancer 270A is implemented jointly with the load balancers 270B for load balancing and reverse proxying the requests between client devices 110 of the users 250 and server devices 120 of the plurality of cloud based platforms. In some embodiments, the load balancer 270A is configured to balance load using a learning process.

In some embodiments, an application developer 350 manages the user application 202 via a client device 110 associated with application developer 350. The application developer 350 issues an evaluation request 418. A network resource evaluation application 420 is implemented for automatic evaluation of implementing the user application 202 via the plurality of cloud based platforms 408. Instructions are generated to display a user interface of the network resource evaluation application 420 on the client device 110 associated with application developer 350. The evaluation request 418 is obtained on the user interface of the network resource evaluation application 420, and includes input data that further includes at least a source identifier 422S and a target identifier 422T. In response to the evaluation request 418, automatically and without user intervention, the load balancer 270A identifies a first server 120A located in a first location on the first cloud based platform 408A based on the source identifier 422S and a second server 120B located in a second location on the second cloud based platform 408B based on the target identifier 422T. The user application 202 is evaluated by performing a first operation on the first server 120A of the first cloud based platform 408A and a second operation on the second server 120B of the second cloud based platform 408B. Data 416 associated with execution of the user application 202 are exchanged between the first server 120A and the second server 120B. In real time, performance data 424 is determined for execution of the user application, and includes at least a function latency of the user application 202. Instructions are further generated to display the performance data 424, on the client device 110 associated with the application developer 350, according to a predefined format on the user interface of the network resource evaluation application 420.

In some embodiments, the performance data 424 further includes one or more of: source/destination mapping information, an available bandwidth, a jitter, a loss percentage, protocol information, receiver octets, and transmitter octets. Further, in some embodiments, the predefined format includes a tabular format, and in accordance with the tabular format, the performance data 424 are displayed in a table (e.g., 620 in FIG. 6) on the user interface of the network resource evaluation application 420. In some embodiments, the performance data 424 include a subset or all of the data 416, associated with execution of the user application 202, which are exchanged between the servers 120A and 120B.

It is noted that, in some embodiments, the first and second operations are implemented by the network resource evaluation application 420 across the multi-cloud network platform between the servers 120A and 120B (e.g., source and destination user application servers). This test process does not directly initiate the user application 202 to process and exchange data for network resource evaluation. Examples of the data 416 associated with execution of the user application 202 include, but are not limited to, performance data, IP addresses, or other cloud network data (e.g., virtual private cloud (VPC), subnet, account number) related to testing of the user application. It is also noted that the first and second operations are implemented by the network resource evaluation application 420 to evaluate the user application 202, while the user application 420 does not implement the first and second operations for its intended functions.

In some embodiments, the plurality of cloud based platforms 408 are provided by a plurality of different cloud service providers for different aspects of their operations. The network resource evaluation application 420 is applied to fetch real-time performance data 424 of the plurality of cloud based platforms 408, independently of their associated cloud service providers. Additionally, the performance data 424 are provided ad hoc using a self-service portal, and therefore, reduces time taken to login to each cloud provider using multi-factor authentication (MFA). In some embodiments, the user application 202 is executed using a combination of on-premises and cloud resources (e.g., the cloud based platforms 408A and 408B), which is evaluated via network resource evaluation application 420 without executing the user application 202 itself for evaluation purposes. The performance data 424 provided via the network resource evaluation application 420 include bandwidth and connectivity information of a portal (e.g., the second portal 440-2 or third portal 4402-3 associated with the cloud based platforms 408A or 408B) coupled between on-premises and cloud resources. In some situations, the network resource evaluation application 420 is applied as a self-service tool to troubleshoot connectivity issues between two cloud platforms or between on-premises and cloud resources and provide historic bandwidth data in time for analytical purposes.

In some embodiments, the network resource evaluation application 420 includes a unified interface across the plurality of cloud based platforms 408 that may be associated with different cloud providers. The network resource evaluation application 420 seamlessly integrates, manages resources, and retrieve data with the plurality of cloud based platforms 408, e.g., using python software development kits (SDKs). For example, every time a resource data is requested, real-time data and resources are retrieved.

In some embodiments, OpenID Connect (OIDC) is applied to authenticate and authorize the application developer 350 when the application developer 350 sign in to access the network resource evaluation application 420. Certificates 426, private keys 428, and redirect URLs are prepared in advance. A flag may be enabled by a different team to achieve a successful authentication. Authentication user data cookies are stored in a secure location, and not in headers for browser compatibility. In some embodiments, proper authorization controls are implemented to restrict access to certain functionalities based on user roles and permissions. Further, in some embodiments, cookies are encrypted using a secret key for security. In some embodiments, logs are audited regularly to identify patterns or anomalies that may indicate unauthorized access or activities. Unauthorized modifications with the logs are monitored as part of identifying security breach. Additionally, in some embodiments, input validation is applied to prevent common web vulnerabilities like structured query language (SQL) injection, cross-site scripting (XSS), and cross-site request forgery (CSRF). In some embodiments, the performance data 424 are stored in an application data file for which file versioning is enabled for monitoring file modifications and backup.

In some embodiments, the network resource evaluation application 420 is implemented using zero touch additional Internet protocol (IP) CIDR processing. Based on the evaluation request 418, the network resource evaluation application 420 requests for additional CIDR through the portal 440-1, and upon request acceptance, the CIDR gets created in the respective cloud based platform 408 by fetching a next available IP in a zero-touch automated process. A CIDR request is reviewed and approved (e.g., via an approval 412A). In response to the CIDR request, an account, a subnet, and IP consumption is reviewed.

In some embodiments, the network resource evaluation application 420 provides real-time monitoring and analytics of the performance data 424 including latency and bandwidth information for cloud connectivity by accessing application programming interfaces (APIs) of native monitoring tools associated with the plurality of cloud based platforms 408. Further, in some embodiments, the APIs are secured by using authentication mechanisms and encrypting communication. API usage is monitored for unusual patterns or unauthorized access.

In some embodiments, the network resource evaluation application 420 is configured to monitor code changes and restart automatically in response to detection of a code change. Applications are hosted as services with a custom port in the backend for the network resource evaluation application 420. In some embodiments, a load balancer 270A sits between client devices 100 and server devices 120A and 120B, forwarding the evaluation request 418 to one of the server devices 120A and 120B associated with the source identifier 422S and the target identifier 422T and returning the response including the performance data 424 to the client device 110 associated with the evaluation request 418 as if the performance data 424 are provided directly from the reverse proxy server 120R. Further, in some embodiments, the load balancer 270A listens on different ports on the same machine, based on a URL path being requested. In an example, the load balancer 270A receives the evaluation request 418 from a user account associated with the user application 202, forwards the evaluation request 418 to a first one 408A of the plurality of cloud based platforms, receives a response from a second one 408B of the plurality of cloud based platforms, and in response to evaluation request 418, provides the response to the user account associated with the user application 202. The user account is managed by an administrator of the user application 202.

A unified cloud evaluation solution is provided to manage resources and data across a plurality of cloud based network platforms 408 (e.g., associated with different providers), thereby enhancing support teams' productivity and reducing cost and time spent on the support issues on a daily basis. Large enterprises can leverage the network resource evaluation application for streamlined and efficient cloud operations on a global scale. The self-service network resource evaluation application 420 reduces the number of incidents created to the application developers 350, as information associated with these incidents can be presented to the application developers 350 automatically or upon request, without intervention by the support teams.

Figure 5:
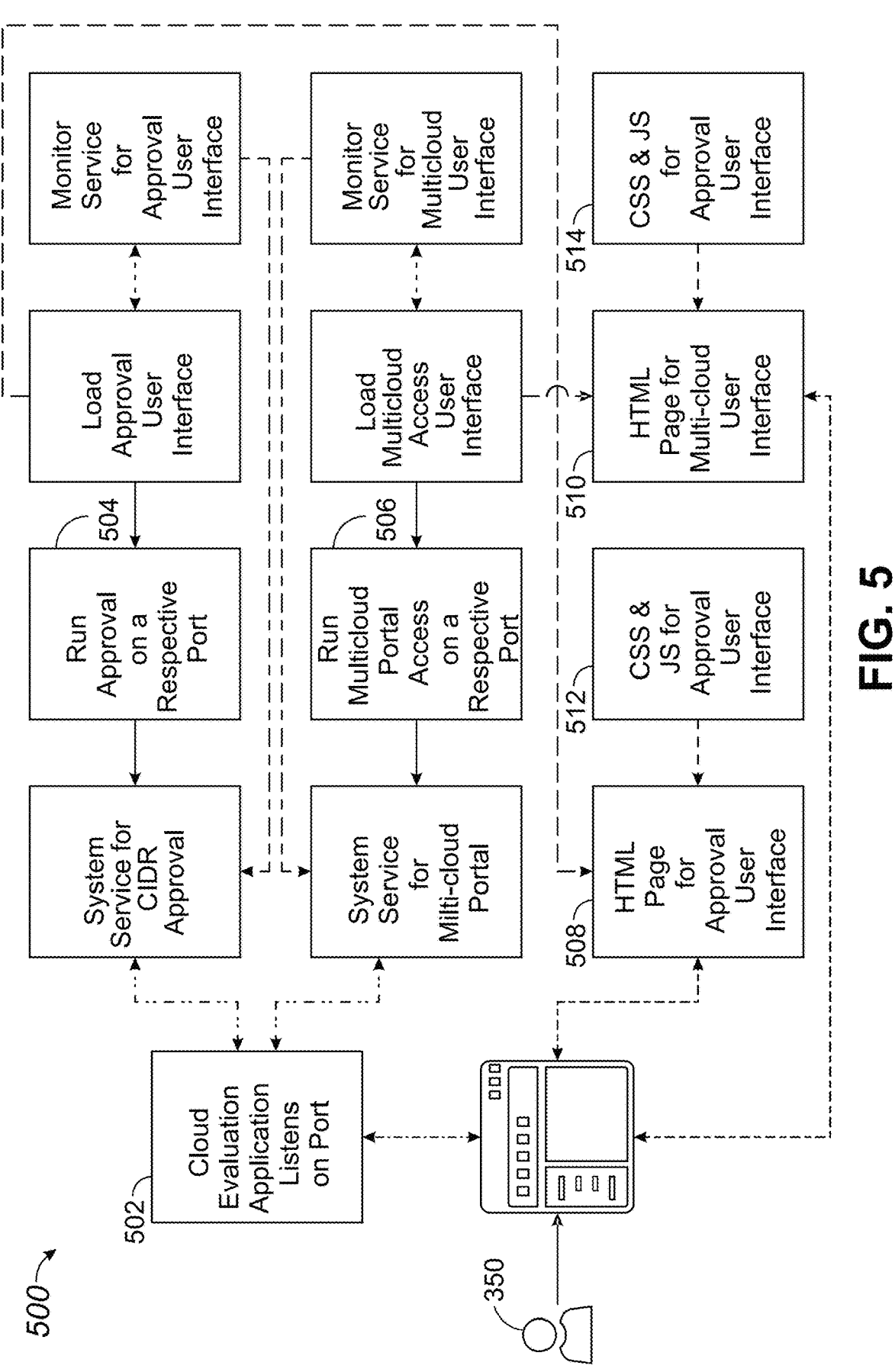
FIG. 5 is a flow diagram illustrating a data flow that starts with a user access to a portal through a web browser, in accordance with some embodiments.

FIG. 5 is a flow diagram illustrating a data flow 500 that starts with a user access to a portal (e.g., portal 440-1 in FIG. 4) through a web browser, in accordance with some embodiments. The data flow 500 starts when a user accesses the portal 440 through a web browser. The network resource evaluation application 420 listens (operation 502) on a port associated with the portal 440, e.g., by way of a load balancer 270A (FIG. 4). A reverse proxy server 120R actually exists at an instance level, which redirects requests based on URI headers to portal (414A) and approval (412A) applications respectively. When a request 418 from the application developer 350 is received, the reverse proxy server 120 associated with the network resource evaluation application 420 checks if it is for an approval 412A or a portal service 414A (e.g., by way of an instance 410A) and redirects traffic accordingly to the respective service. The approval 412A and portal 414A are configured to run (operations 504 and 506) on two distinct ports associated with the portals 4402-2 and 440-3, respectively. In some embodiments, a CIDR request is reviewed and approved (e.g., via an approval 412A). In response to the CIDR request, an account, a subnet, and IP consumption is reviewed.

In some embodiments, program codes of the network resource evaluation application 420 are stored in a bitbucket repository 430 (FIG. 4) and downloaded as required. Program codes of the associated user application 202 may not be downloaded, and program codes of the network resource evaluation application 420 may be downloaded for the purposes of evaluating the user application 202. A monitoring service 434 (FIG. 4) keeps track of any changes to a data file and restarts services when a modification is detected. The network resource evaluation application 420 feed (operations 508 and 510) the approval and portal HyperText Markup Language (HTML) pages with the required information, and handle any actions performed on the webpage. Cascading Style Sheets (CSS) and JavaScript (JS) are used (operations 512 and 514) on the HTML pages for styles and scripts respectively.

Figure 6:
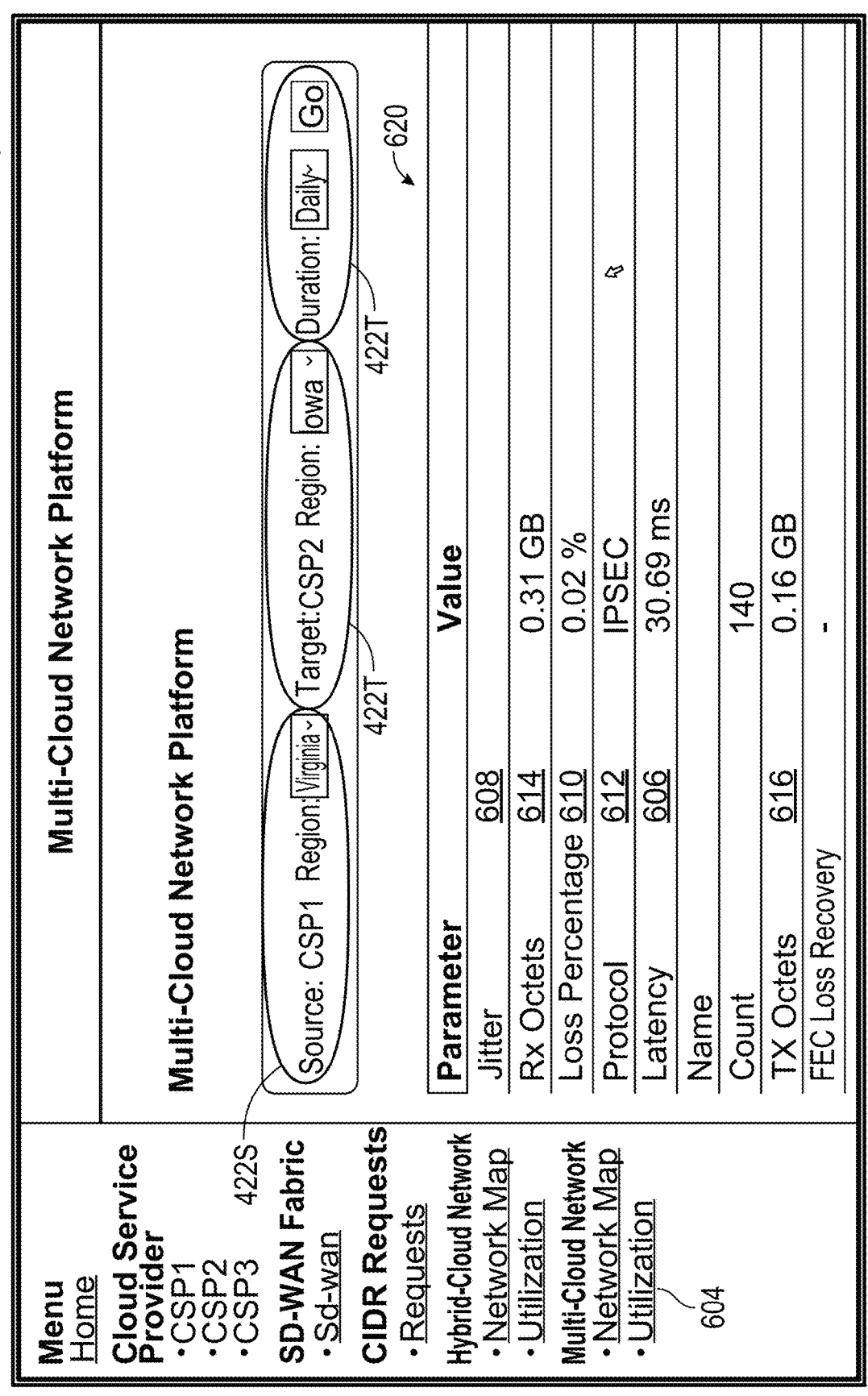
FIG. 6 is a user interface of a network resource evaluation application presenting information of multi-cloud network utilization, in accordance with some embodiments.

FIG. 6 is a user interface 600 of a network resource evaluation application 420 presenting information of multicloud network utilization, in accordance with some embodiments. An evaluation request 418 is obtained on the user interface 600 of the network resource evaluation application 420, and includes input data. The input data includes a user selection of a utilization affordance 604 to load the user interface 600, a source identifier 422S, and a target identifier 422T. An application developer 350 selects a "Source: CSP1", "Region: Virginia", "Target: CSP2", "Region: Iowa" and "Duration: Daily" from a list of choices. Specifically, in some embodiments, the network resource evaluation application 420 provides a list of source candidates from which the source identifier 422S (e.g., "Source: CSP1" and "Region: Virginia") is selected and a list of target candidates from which the target identifier 422T (e.g., "Source: CSP2" and "Region: Iowa") is selected. In some embodiments, a user application 202 managed by the application developer 350 includes a frontend program and a background program. The frontend program runs on a first server 120A located in a first location as defined by the source identifier 422S, and the background program runs on a second server 120B located in a second location as defined by the target identifier 422T. The evaluation application 420 evaluations execution of the frontend program, execution of the backend program, and data communication between the servers 120A and 120B. During evaluation, data 416 (FIG. 4) associated with execution of the user application 202 are exchanged between the first server 120A and the second server 120B. In some embodiments, the second server 120B executes a machine learning model (e.g., a large language model), and an example of the machine learning model is a generative pre-trained transformer. Data source of truth may be stored as Yet Another Multicolumn Layout (YAML). Python is used to retrieve and analyze real time values from cloud platforms and present to the user.

In some embodiments, a field following "Source:" is configured to identify origin of network traffic (e.g., application name, service)), and a field following "Destination:" is configured to identify target of the traffic (e.g., another application, service)). A field following "Source Region:" is configured to identify a region where the source resides, and a field following "Destination Region:" is configured to identify a region where the destination resides. A field following "Duration:" is configured to identify a time period for which the metrics are collected (e.g., hour, day, week).

In some embodiments, the performance data 424 generated by the network resource evaluation application 420 includes at least a function latency 606 and one or more of: source/destination mapping information, an available bandwidth, a jitter 608, a loss percentage 610, protocol information 612, receiver octets 614, and transmitter octets 616. Further, in some embodiments, the predefined format includes a tabular format, and in accordance with the tabular format, the performance data 424 are displayed in a table 620 on the user interface 600 of the network resource evaluation application 420.

In some embodiments, the first cloud platform 408A is the second cloud platform 408B, and the first location is distinct from the second location. The first server 120A and the second server 120B are distinct from each other and belong to the first cloud platform 408A. Alternatively, in some embodiments, the second cloud based platform 408B is independent, and distinct, from the first cloud based platform 408A, and the first server 120A and the second server 120B are distinct from each other and belong to two distinct cloud platforms 408.

In some embodiments, the first cloud based platform 408A including the first server 120A is provided by a first third-party cloud provider CSP1. The second cloud based platform 408B including the second server 120B is provided by a second third-party cloud provider CSP2 distinct from the first third-party cloud provider CSP1. Both the first third-party cloud provider CSP1 and the second third-party cloud provider CSP2 are distinct from a service provider of the network resource evaluation application 420 or the user application 202. In some embodiments, each of the first cloud based platform and the second cloud based platform is selected from: Amazon Web Services (AWS), Google Cloud Platform (GCP), Oracle Cloud Infrastructure (OCI), Azure Cloud Service (ACS), Cisco Cloud Solutions (CCS), Hewlett Packard Enterprise (HPE) GreenLake, IBM Cloud Platform, VMware Cloud, and DigitalOcean Droplets. In an example, each of the first cloud based platform and the second cloud based platform is selected from Amazon Web Services (AWS), Google Cloud Platform (GCP), and Azure Cloud Service (ACS).

Figure 7:
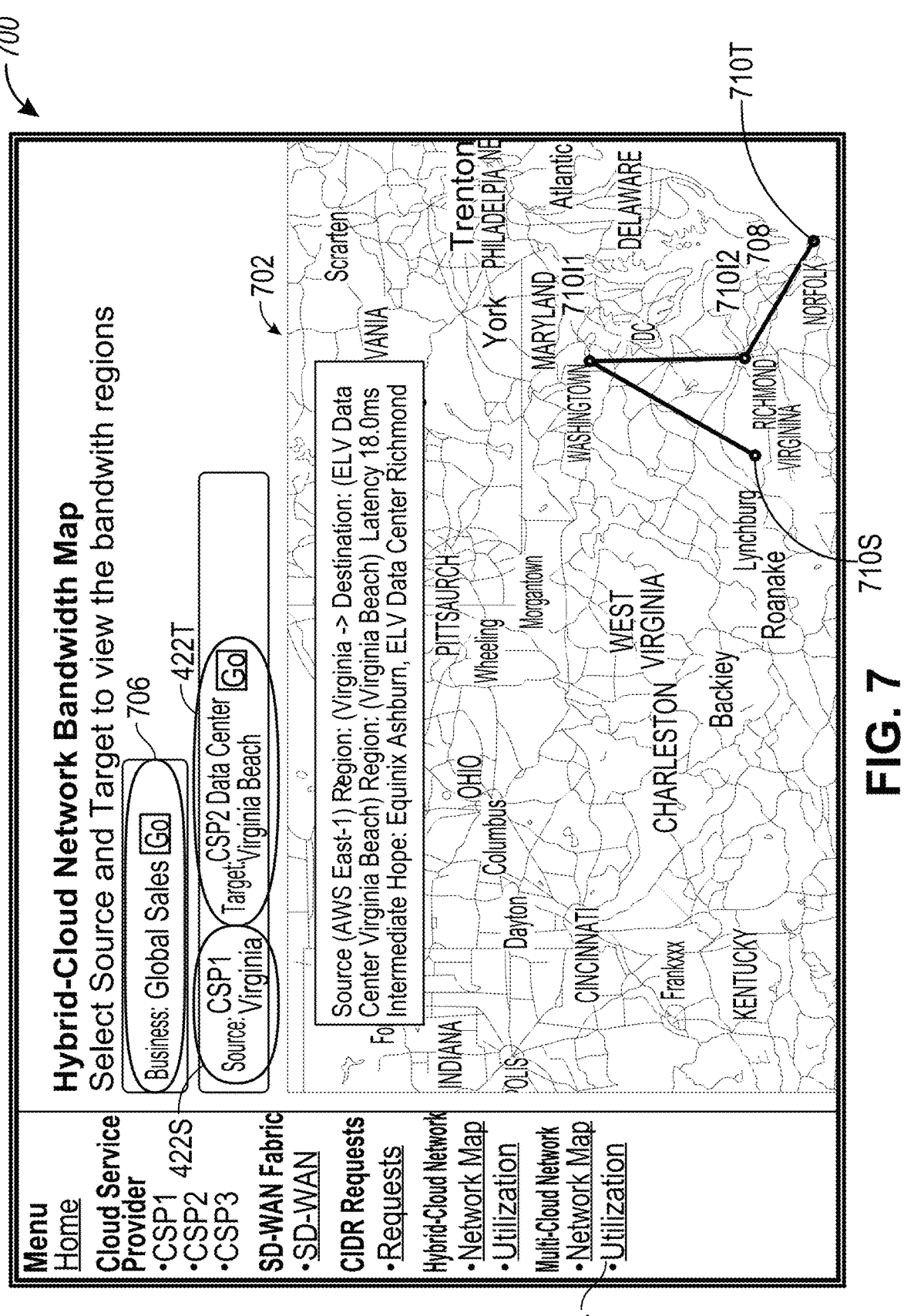
FIG. 7 is a user interface of a network resource evaluation application presenting a network map, in accordance with some embodiments.

FIG. 7 is a user interface 700 of a network resource evaluation application 420 presenting a network map 702, in accordance with some embodiments. An evaluation request 418 is obtained on the user interface 700 of the network resource evaluation application 420, and includes input data. The input data includes a user selection of a network map affordance 704 to load the user interface 700, a source identifier 422S, and a target identifier 422T. In some embodiments, a user application 202 managed by the application developer 350 is identified by a function identifier 706 that indicates a business associated with the user application. For example, the function identifier 706 is "Business: Global Sales," which identifies a business unit associated with the traffic. A program runs on a first server 120A located in a first location as defined by the source identifier 422S (e.g., "Source: CSP1 Virginia"), and accesses data stored in a second server (also called a second data center) located in a second location as defined by the target identifier 422T (e.g., "Target: CSP2 Data Center Virginia Beach"). The network map 702 visualizes that a data request of the program executed on the first server 120A is routed through servers or data centers in Washington D.C. and Richmond, Virginia to access the data stored in the second data center located in Virginia Beach.

In some embodiments, the first server 120A of the first cloud based platform 408A corresponds to one or more processors configured to perform the first operation on data associated with the user application 202, and the second server 120B of the second cloud based platform 408B corresponds to a data server configured to perform the second operation to extract or store the data associated with the user application 202. Further, in some embodiments, the first cloud based platform 408A includes the second cloud based platform 408B, and is associated with a cloud provider distinct from a service provider controlling the network resource evaluation application 420 and/or the user application 202. Additionally, the performance data may include a function latency 606 and/or a data access bandwidth between the first server 120A and the second server 120B, which is offered to the user application 202 by the cloud provider, and the function latency 606 and/or data access bandwidth is displayed on the user interface 700.

In some embodiments, a multi-cloud network map is displayed with dynamic visualization that allows filtering. A field following "Source:" is configured to identify origin of network traffic (e.g., application name, service)), and a field following "Destination:" is configured to identify target of the traffic (e.g., another application, service)). A field following "Source Region:" is configured to identify a region where the source resides, and a field following "Destination Region:" is configured to identify a region where the destination resides. The network map may be dynamically updated based on these filters.

Figure 8A:
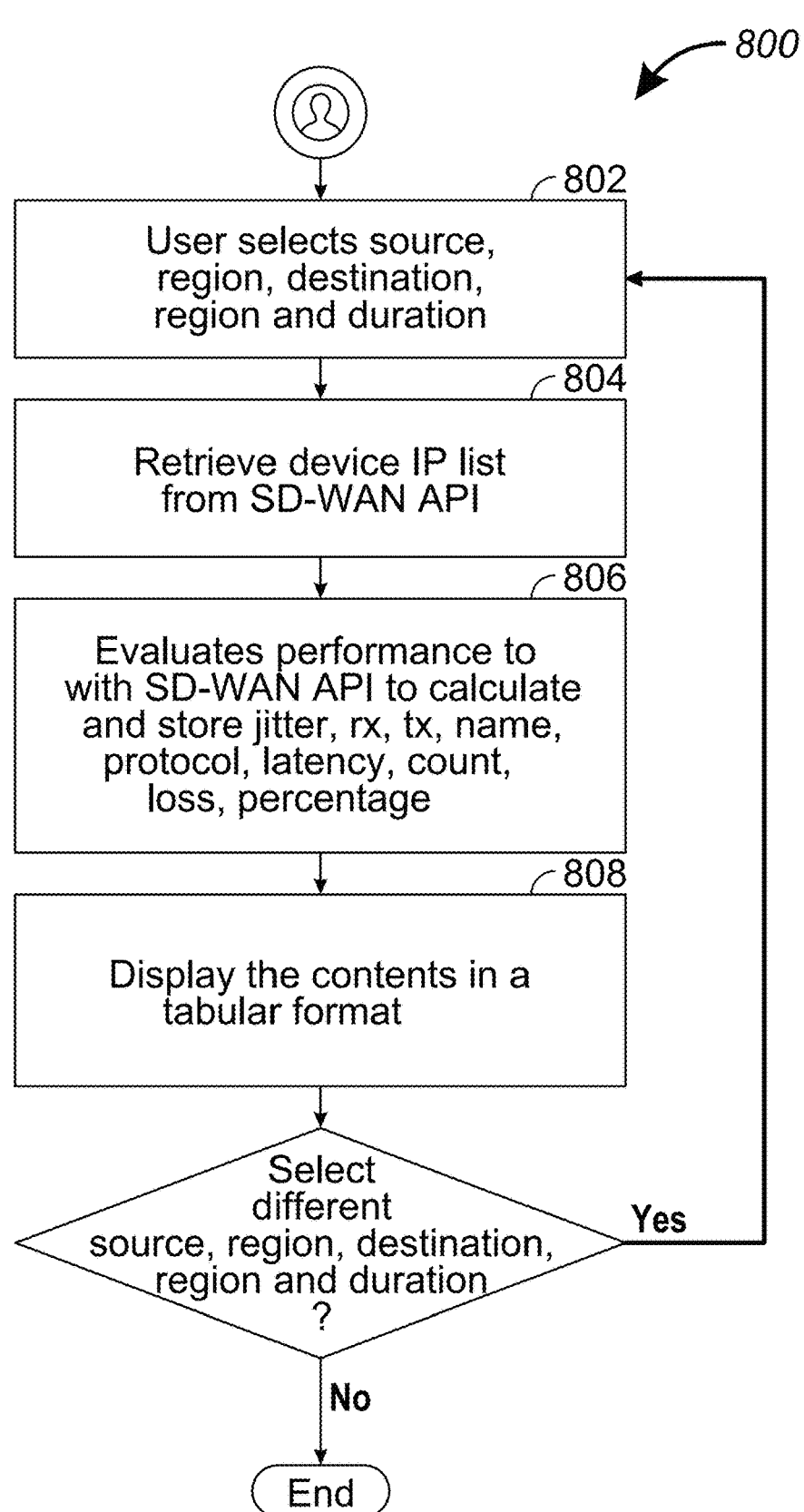
FIG. 8A is a flow diagram of an example processes for generating multi-cloud network utilization information for a multi-cloud network platform, in accordance with some embodiments.

FIG. 8A is a flow diagram of an example processes 800 for generating multi-cloud network utilization information (e.g., shown in a table 620 in FIG. 6) for a multi-cloud network platform, in accordance with some embodiments. A network resource evaluation application 420 is executed on a SS PROD environment 404 (FIG. 4) for automatic evaluation of implementing a user application 202 via a plurality of cloud based platforms including a first cloud based platform 408A and a second cloud based platform 408B. A user interface of the network resource evaluation application 420 is displayed on a client device 110 associated with an application developer 350. The application developer 350 selects (operation 802), on the user interface, each of "Source", "Source Region", "Target", "Target Region" from a respective list of choices, thereby defining a source identifier 422S and a target identifier 422T. In some embodiments, the application developer 350 selects or enters a duration time 618 (FIG. 6) on the user interface of the network resource evaluation application 420. A device IP list may be retrieved (operation 804) from a network API (e.g., wide-area network (WAN) API). For example, the user application is evaluated (operation 806) with the network API to determine performance data 424 including a function latency 606 and one or more of: source/destination mapping information, an available bandwidth, a jitter 608, a loss percentage 610, protocol information 612, receiver octets 614, and transmitter octets 616. In some embodiments, the performance data 424 is presented (operation 808) in a tabular format on the user interface of the network resource evaluation application 420.

In some embodiments, at least one of the first server 120A and the second server 120B is predefined. The evaluation request 420 includes information for identifying a distinct server, e.g., by receiving input data of "Region", "Service" and "Duration" from a list of choices. Upon selection of "region" and "service," a user application managed by the administrator 350 is evaluated to determine the performance data 424 (e.g., a bandwidth) of the distinct server during a duration of time. The performance data 424 is presented on a tabular format or a graphic format. For example, a function latency is plotted on a line graph for the selected duration of time.

Figure 8B:
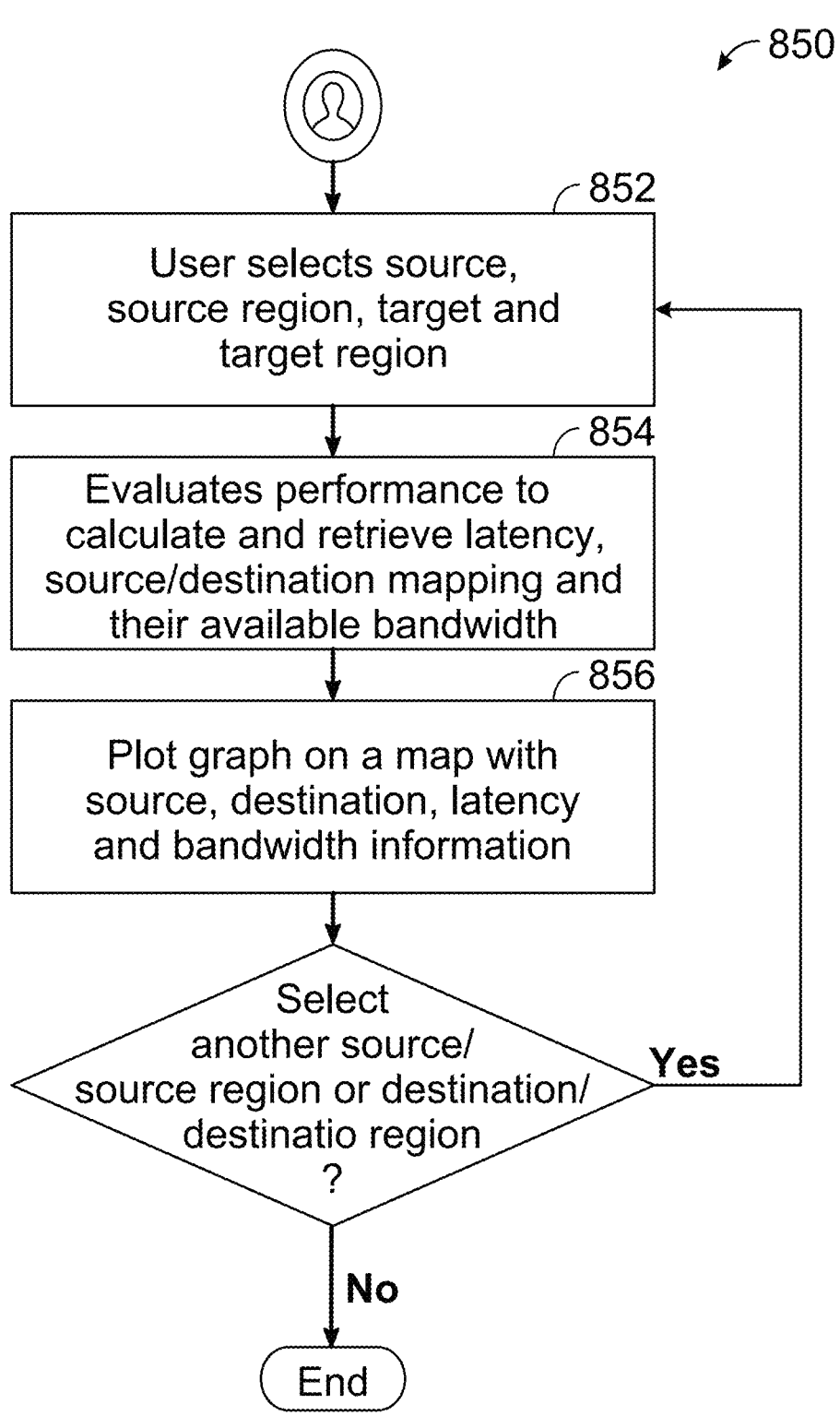
FIG. 8B is a flow diagram of an example processes for generating a network map for a multi-cloud network platform, in accordance with some embodiments.

FIG. 8B is a flow diagram of an example processes 850 for generating a network map 702 (FIG. 7) for a multi-cloud network platform, in accordance with some embodiments. A network resource evaluation application 420 is executed on a SS PROD environment 404 (FIG. 4) for automatic evaluation of implementing a user application 202 via a plurality of cloud based platforms including a first cloud based platform 408A and a second cloud based platform 408B. A user interface of the network resource evaluation application 420 is displayed on a client device 110 associated with an application developer 350. The application developer 350 selects (operation 852) each of "Source", "Source Region", "Target", "Target Region" from a respective list of choices, thereby defining a source identifier 422S and a target identifier 422T. A network resource evaluation application 420 is executed (operation 854) to determine performance data 424 associated with the user application 202 including a function latency 606, source and destination mapping, and available bandwidths of a first server 120A associated with the source identifier 422S and a second server 120B associated with the target identifier 422T. In some embodiments, the performance data 424 is presented (operation 856) on a map 702 including locations 710S and 710T of the first server 120A and the second server 120B, the latency 606, and the bandwidths.

Stated another way, in some embodiments, the map 702 includes a plurality of marks indicating at least the first server 120A located in the first location 710S, the second server 120B located in the second location 710T, and one or more information hops 708. Further, the plurality of marks of the map 702 indicate an intermediate server in an intermediate location 710I1 or 710I2 distinct from the first location 710S and the second location 710T, and a first information hop 708 couples the intermediate server in the intermediate location 710I2 to one of the first server 120A located in the first location 710S and the second server 120B located in the second location 710T. For example, regions are plotted in a skeletal map 702, and lines are added on the map 702 from the first server 120A to one or more intermediate hops 708 to the second server 120B. In some embodiments, one or more annotations are added to indicate the function latency 606 and/or the bandwidths of associated cloud based platforms 408. Further, in some embodiments, an interactive map is presented to the application developer 350 to improve visibility of the performance data 424.

In some embodiments, referring to FIG. 7, a user application 202 managed by the application developer 350 is identified by a function identifier 706 that indicates a business associated with the user application. For example, the function identifier 706 is "Business: Global Sales." The function identifier 706 is applied to determine the first server 120A and the second server 120B automatically. For instance, two fields of the source and target resources are automatically populated with two lists of choices from which the application developer 350 further selects the source identifier 422S and the target identifier 422T, respectively.

Figure 9:
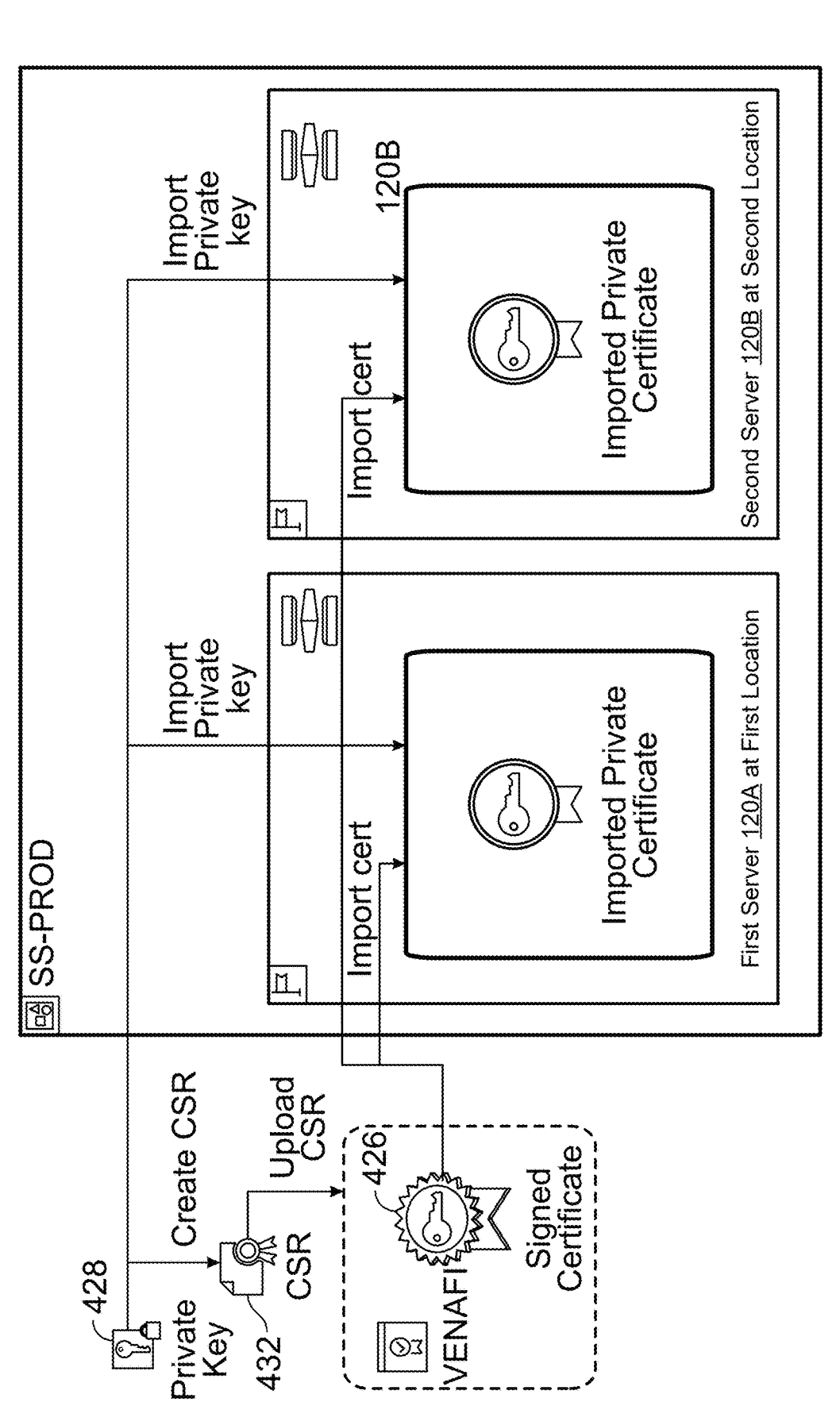
FIG. 9 is a flow diagram of an example security management process on a plurality of cloud based platforms, in accordance with some embodiments.

FIG. 9 is a flow diagram of an example security management process 900 on a plurality of cloud based platforms 408, in accordance with some embodiments. A pair of public and private keys is applied to authenticate authorized users of the network resource evaluation application 420. The plurality of cloud based platforms 408 are configured to provide a user application platform hosting a plurality of software applications associated with a service provider, and the plurality of software applications includes the user application 202. The network resource evaluation application 420 is provided by the service provider and configured to be accessed by administrator accounts associated with administrators 360 (FIG. 4) of the plurality of software applications. The security management process 900 applies one-time private key 428, one-time key-based certificate signing request (CSR) 432, and one-time certificate 426 on the plurality of cloud based platforms 408, thereby avoiding repeated user authentication and authorization for each individual platform 408 during the course of implementing the network resource evaluation application 4202. The private key 428 is used with a configuration file to create the CSR 432, and in response to the CSR 432, the certificate 426 is provided by a certificate authority as a certificate file. In some embodiments, the private key 428 is created using an OpenSSL protocol, and the configuration file is created with a distinguished domain name and alternative domain names.

An application (e.g., the user application 202, the network resource evaluation application 420) uses Secure Sockets Layer (SSL)/Transport Layer Security (TLS) to establish a secure, encrypted connection between a client device 110 and a server device 120. SSL/TLS integration is implemented with the certificate 426 and the private key 428. The certificate 426 is used to verify an identity of a server 120 associated with a cloud based platform 408, while the private key 428 is used to encrypt and decrypt data. Files for the certificate 426 and private key 428 are stored securely in a designated directory.

An SSL context is created for the user application 202 and/or the network resource evaluation application 420, and enables secure communication between the server 120 and clients 100. The SSL context can be configured to use a certificate file and private key file (e.g., in PEM format) to authenticate the server 120 and encrypt the communication. By using SSL integration with certificates and PEM keys, the application ensures that communication between the server 120 and clients 100 is secure and encrypted. Stated another way, a secured session may be established for evaluating performance of the user application. A pair of public and private keys is applied to authenticate an identification of the server 120 that executes the network resource evaluation application 420.

FIG. 10 is a flow diagram of a method for performing cloud evaluation on a multi-cloud network platform, in accordance with some embodiments. For convenience, the method 1000 is described as being implemented by a system. Method 1000 is, optionally, governed by instructions that are stored in a non-transitory computer readable storage medium and that are executed by one or more processors of the system. Each of the operations shown in FIG. 10 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1000 may be combined and/or the order of some operations may be changed.

The method 1000 is implemented at a server 120 of the system. The system executes (operation 1002) a network resource evaluation application 420 for automatic evaluation of implementing a user application 202 via a plurality of cloud based platforms 408 including a first cloud based platform 408A and a second cloud based platform 408B. The system generates (operation 1004) instructions to display a user interface of the network resource evaluation application 420 on a client device 110, and obtains (operation 1006), via the user interface of the network resource evaluation application 420 from the client device 110, an evaluation request 418 includes input data wherein the input data comprises at least a source identifier 422S and a target identifier 422T. In response (operation 1008) to the evaluation request 418, automatically and without user intervention, the system identifies (operation 1010) a first server 120A located in a first location on the first cloud based platform 408A based on the source identifier 422S, identifies (operation 1012) a second server 120B located in a second location on the second cloud based platform 408B based on the target identifier 422T, evaluates (operation 1014) performance of the user application 202. Evaluation further includes determining a first operation and a second operation associated with the user application 202, where the second operation is independent and distinct from the first operation; at the first server 120A of the first cloud based platform 408A, performing the first operation associated with the user application 202; at the second server 120B of the second cloud based platform 408B, performing the second operation associated with the user application 202; and exchanging data associated with execution of the user application 202 between the first server 120A and the second server 120B. In real time, the system determines (operation 1016) performance data 424 for implementing the user application 202 at the first server 120A and the second server 120B. The performance data 424 include at least a function latency 606. The system generates (operation 1018) instructions to display the performance data 424 according to a predefined format on the user interface of the network resource evaluation application 420 at the client device 110.

In some embodiments, the performance data 424 further includes one or more of: source/destination mapping information, an available bandwidth, a jitter 608, a loss percentage 610, protocol information 612, receiver octets 614, and transmitter octets 616. Further, in some embodiments, the predefined format includes a tabular format, and in accordance with the tabular format, the performance data 424 are displayed in a table on the user interface of the network resource evaluation application 420.

In some embodiments, referring to FIG. 7, the predefined format includes a map format, and in accordance with the map format, the performance data 424 are displayed on a map 702. The map 702 includes a plurality of marks indicating at least the first server 120A located in the first location 710S, the second server 120B located in the second location 710T, and one or more information hops 708. Further, in some embodiments, the plurality of marks of the map indicates an intermediate server in an intermediate location 710I1 or 710I2 distinct from the first location 710S and the second location 710T, and a first information hop 708 couples the intermediate server in the intermediate location 710I2 to one of the first server 120A located in the first location 710S and the second server 120B located in the second location 710T.

In some embodiments, each of the first cloud based platform 408A and the second cloud based platform 408B includes a plurality of respective servers 120 distributed at a plurality of physical locations.

In some embodiments, the first server 120A of the first cloud based platform 408A corresponds to one or more processors configured to perform the first operation on data associated with the user application 202, and the second server 120B of the second cloud based platform 408B corresponds to a data server configured to perform the second operation to extract or store the data associated with the user application 202. Further, in some embodiments, the first cloud based platform 408A includes the second cloud based platform 408B, and is associated with a cloud provider distinct from a service provider controlling the network resource evaluation application 420 and the user application 202. Additionally, in some embodiments, the performance data 424 includes a data access bandwidth between the first server 120A and the second server 120B, which is offered to the user application 202 by the cloud provider, and the data access bandwidth is displayed on the user interface.

In some embodiments, the first cloud platform 408A is the second cloud platform 408B, and the first location is distinct from the second location. The first server 120A and the second server 120B are distinct from each other and belong to the first cloud platform 408A. Alternatively, in some embodiments, the first cloud platform 408A is the second cloud platform 408B, and the first location is identical to the second location. Alternatively, in some embodiments, the second cloud based platform 408B is independent, and distinct, from the first cloud based platform 408A, and the first server 120A and the second server 120B are distinct from each other and belong to two distinct cloud platforms 408.

In some embodiments, the first cloud based platform 408A is provided by a first third-party cloud provider. The second cloud based platform 408B is provided by a second third-party cloud provider distinct from the first third-party cloud provider. In some embodiments, both the first third-party cloud provider and the second third-party cloud provider are distinct from a service provider of the network resource evaluation application 420 or the user application 202. Further, in some embodiments, each of the first cloud based platform 408A and the second cloud based platform 408B is selected from Amazon Web Services (AWS), Google Cloud Platform (GCP), Oracle Cloud Infrastructure (OCI), Azure Cloud Service (ACS), Cisco Cloud Solutions (CCS), Hewlett Packard Enterprise (HPE) GreenLake, IBM Cloud Platform, VMware Cloud, and DigitalOcean Droplets. Additionally, in some embodiments, each of the first cloud based platform 408A and the second cloud based platform 408B is selected from Amazon Web Services (AWS), Google Cloud Platform (GCP), and Azure Cloud Service (ACS).

In some embodiments, a network resource load balancer 270A is coupled to the first cloud based platform 408A and the second cloud based platform 408B. The load balancer 270A receives, on the network resource evaluation application 420, the evaluation request 418 from a user account associated with the user application 202, forwards the evaluation request 418 to a first one of the plurality of cloud based platforms 408, receives a response from a second one of the plurality of cloud based platforms 408, and in response to the evaluation request 418, provides the response associated with the user account of the user application 202. The user account is managed by an administrator of the user application 202.

In some embodiments, referring to FIG. 4, the evaluation request 418 is received via the first portal 440-1. A reverse proxy server 120R actually exists at an instance level, which redirects requests based on URI headers to portal (414A) and approval (412A) applications respectively. Further, in some embodiments, referring to FIG. 5, in response to obtaining the evaluation request 418, the reverse proxy server 120R determines whether the evaluation request 418 includes an approval request 412A or a portal service request 414A associated with one or more second portals 440-2. In accordance with a determination that the evaluation request 418 includes the approval request 412A, the system feeds an approval HTML page with approval information. In accordance with a determination that the evaluation request 418 includes the portal service request 414A, the system feeds a portal HTML page with portal service information. Further, in some embodiments, the system generates instructions to enable display of the performance data 424 by generating instructions to display a webpage rendered based on one of the approval HTML page and the portal HTML page according to Cascading Style Sheets (CSS) or JavaScript.

In some embodiments, a secured session is established for evaluating performance of the user application. A pair of public and private keys is applied to authenticate an identification of the server that executes the network resource evaluation application 420.

In some embodiments, the plurality of cloud based platforms 408 are configured to provide a user application platform hosting a plurality of software applications associated with a service provider, the plurality of software applications including the user application 202, and the network resource evaluation application 420 is provided by the service provider and configured to be accessed by administrator accounts of the plurality of software applications.

In some embodiments, the input data includes a function identifier. In accordance with the function identifier, the system provides a list of source candidates from which the source identifier 422S is selected and a list of target candidates from which the target identifier 422T is selected.

It will also be understood that, although the terms first, second, etc. are, in some instances, used herein to describe various elements, these elements should not be limited by these terms. These terms are only used to distinguish one element from another. For example, a first electronic device could be termed a second electronic device, and, similarly, a second electronic device could be termed a first electronic device, without departing from the scope of the various described implementations. The first electronic device and the second electronic device are both electronic devices, but they are not necessarily the same electronic device.

The terminology used in the description of the various described implementations herein is for the purpose of describing particular implementations only and is not intended to be limiting. As used in the description of the various described implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The foregoing description, for purpose of explanation, has been described with reference to specific implementations. However, the illustrative discussions above are not intended to be exhaustive or to limit the scope of the claims to the precise forms disclosed. Many modifications and variations are possible in view of the above teachings. The implementations are chosen in order to best explain the principles underlying the claims and their practical applications, to thereby enable others skilled in the art to best use the implementations with various modifications as are suited to the particular uses contemplated.

What is claimed is:

1. A method for evaluating network resources on a multi-cloud network platform, comprising, at a server machine having one or more processors and memory:
  executing a network resource evaluation application for evaluation of implementing a user application via a plurality of cloud based platforms including a first cloud based platform and a second cloud based platform;
  obtaining, via the network resource evaluation application, an evaluation request comprising input data wherein the input data comprises at least a source identifier and a target identifier;
  in response to the evaluation request:
    identifying a first server on the first cloud based platform based on the source identifier;

identifying a second server on the second cloud based platform based on the target identifier;
    exchanging data associated with execution of the user application between the first server and the second server; and
    in real time, determining performance data for implementing the user application at the first server and the second server, the performance data including at least a function latency; and
  generating instructions to display the performance data according to a predefined format via the network resource evaluation application.

2. The method of claim 1, wherein the performance data further includes one or more of: source/destination mapping information, an available bandwidth, a jitter, a loss percentage, protocol information, receiver octets, and transmitter octets.

3. The method of claim 1, wherein the predefined format includes a tabular format, the method further comprising:
  generating instructions to display a user interface of the network resource evaluation application on a client device, wherein in accordance with the tabular format, the performance data are displayed in a table on the user interface of the network resource evaluation application.

4. The method of claim 1, wherein:
  the predefined format includes a map format, and in accordance with the map format, the performance data are displayed on a map; and
  the map includes a plurality of marks indicating at least the first server located in a first location, the second server located in a second location, and one or more information hops.

5. The method of claim 4, wherein the plurality of marks of the map indicates an intermediate server in an intermediate location distinct from the first location and the second location, and a first information hop couples the intermediate server in the intermediate location to one of the first server located in the first location and the second server located in the second location.

6. The method of claim 1, wherein each of the first cloud based platform and the second cloud based platform includes a plurality of respective servers distributed at a plurality of physical locations.

7. The method of claim 1, further comprising:
  determining a first operation and a second operation associated with the user application, wherein the second operation is independent and distinct from the first operation,
  at the first server of the first cloud based platform, performing the first operation on data associated with the user application; and
  at the second server of the second cloud based platform, performing the second operation of the user application to extract or store the data associated with the user application.

8. The method of claim 1, wherein the first cloud based platform includes the second cloud based platform, and is associated with a cloud provider distinct from a service provider controlling the network resource evaluation application and the user application.

9. The method of claim 8, wherein the performance data includes a data access bandwidth between the first server and the second server, which is offered to the user application by the cloud provider, and the data access bandwidth is displayed on a user interface of the user application.

10. The method of claim 1, wherein:

the first cloud based platform is provided by a first third-party cloud provider; and the second cloud based platform is provided by a second third-party cloud provider distinct from the first third-party cloud provider; and both the first third-party cloud provider and the second third-party cloud provider are distinct from a service provider of the network resource evaluation application or the user application.

11. The method of claim 10, wherein each of the first cloud based platform and the second cloud based platform is selected from Amazon Web Services (AWS), Google Cloud Platform (GCP), Oracle Cloud Infrastructure (OCI), Azure Cloud Service (ACS), Cisco Cloud Solutions (CCS), Hewlett Packard Enterprise (HPE) GreenLake, IBM Cloud Platform, VMware Cloud, and DigitalOcean Droplets.

12. The method of claim 1, further comprising, at a network resource load balancer:

receiving the evaluation request from a user account associated with the user application;

forwarding the evaluation request to the first server on the first cloud based platform;

receiving a response from the second server on the second cloud based platform; and in response to the evaluation request, providing the response to the user account associated with the user application.

13. A server machine, comprising:

one or more processors; and memory having instructions stored thereon, which when executed by the one or more processors cause the processors to perform operations for:

executing a network resource evaluation application for evaluation of implementing a user application via a plurality of cloud based platforms including a first cloud based platform and a second cloud based platform;

obtaining, via the network resource evaluation application, an evaluation request comprising input data wherein the input data comprises at least a source identifier and a target identifier;

in response to the evaluation request:

identifying a first server on the first cloud based platform based on the source identifier;

identifying a second server on the second cloud based platform based on the target identifier;

exchanging data associated with execution of the user application between the first server and the second server; and in real time, determining performance data for implementing the user application at the first server and the second server, the performance data including at least a function latency; and generating instructions to display the performance data according to a predefined format via the network resource evaluation application.

14. The server machine of claim 13, wherein the memory further stores instructions for, in response to obtaining the evaluation request via a first portal:

determining, by a reserve proxy server, whether the evaluation request includes an approval request or a portal service request associated with one or more second portals;

in accordance with a determination that the evaluation request includes the approval request, feeding an approval HTML page with approval information; and in accordance with a determination that the evaluation request includes the portal service request, feeding a portal HTML page with portal service information.

15. The server machine of claim 14, generating instructions to enable display of the performance data further comprising:

generating instructions to display a webpage rendered based on one of the approval HTML page and the portal HTML page according to Cascading Style Sheets (CSS) or JavaScript.

16. The server machine of claim 13, wherein the memory further stores instructions for:

establishing a secured session for evaluating performance of the user application, including applying a pair of public and private keys to authenticate an identification of the server machine that executes the network resource evaluation application.

17. A non-transitory computer-readable medium, having instructions stored thereon, which when executed by one or more processors of a server machine cause the processors to perform operations comprising:

executing a network resource evaluation application for evaluation of implementing a user application via a plurality of cloud based platforms including a first cloud based platform and a second cloud based platform;

obtaining, via the network resource evaluation application, an evaluation request comprising input data wherein the input data comprises at least a source identifier and a target identifier;

in response to the evaluation request:

identifying a first server on the first cloud based platform based on the source identifier;

identifying a second server on the second cloud based platform based on the target identifier;

exchanging data associated with execution of the user application between the first server and the second server; and in real time, determining performance data for implementing the user application at the first server and the second server, the performance data including at least a function latency; and generating instructions to display the performance data according to a predefined format via the network resource evaluation application.

18. The non-transitory computer-readable medium of claim 17, wherein the plurality of cloud based platforms are configured to provide a user application platform hosting a plurality of software applications associated with a service provider, the plurality of software applications including the user application, and the network resource evaluation application is provided by the service provider and configured to be accessed by administrator accounts of the plurality of software applications.

19. The non-transitory computer-readable medium of claim 17, wherein the input data includes a function identifier, obtaining the evaluation request further comprising, in accordance with the function identifier:

providing a list of source candidates from which the source identifier is selected; and providing a list of target candidates from which the target identifier is selected.

20. The non-transitory computer-readable medium of claim 17, wherein the first cloud platform is the second cloud platform, and the first server and the second server are located on two different locations and belong to the first cloud platform.

* * * * *